US009228352B2

(12) United States Patent
Valentz et al.

(10) Patent No.: US 9,228,352 B2
(45) Date of Patent: Jan. 5, 2016

(54) INSULATED SKYLIGHT ASSEMBLY AND METHOD OF MAKING SAME

(75) Inventors: Arthur J. Valentz, Sugar Land, TX (US); John E. Nemazi, Bloomfield Hills, MI (US); G. Daniel Templeton, Fort Wayne, IN (US)

(73) Assignee: VTEC PATENTS LLC, Houston, TX (US)

(*) Notice: Subject to any disclaimer, the term of this patent is extended or adjusted under 35 U.S.C. 154(b) by 657 days.

(21) Appl. No.: 12/335,584

(22) Filed: Dec. 16, 2008

(65) Prior Publication Data

US 2010/0146880 A1    Jun. 17, 2010

(51) Int. Cl.
| E04D 13/03 | (2006.01) |
| E06B 3/67 | (2006.01) |
| E06B 3/663 | (2006.01) |
| E04C 2/54 | (2006.01) |
| E04D 13/147 | (2006.01) |

(52) U.S. Cl.
CPC ............ E04D 13/0315 (2013.01); E04C 2/543 (2013.01); E04D 13/033 (2013.01); E04D 13/0305 (2013.01); E06B 3/66328 (2013.01); E06B 3/6715 (2013.01); E04D 13/1476 (2013.01)

(58) Field of Classification Search
CPC ............ E04D 2013/0345; E04D 13/0315; E04D 13/03; E04D 13/033; E04D 13/0305; E04D 12/002; E04D 13/1476; E06B 3/6715; E06B 3/6612; E06B 3/6621; E06B 3/663; E06B 3/66304; E06B 3/66309; E06B 3/66333; E06B 3/66328; E06B 3/6775; E04C 2/54; E04C 2/543; E04C 2/34; Y10T 428/234; Y10T 428/239; Y10T 428/24661; Y10T 29/49623

USPC ............................................................ 52/200
See application file for complete search history.

(56) References Cited

U.S. PATENT DOCUMENTS

| 2,918,023 | A | * | 12/1959 | Bettcher ............................ 52/22 |
| 3,127,699 | A | * | 4/1964 | Wasserman ....................... 52/22 |
| 3,434,251 | A | * | 3/1969 | Kiekhaefer ....................... 52/22 |
| 3,861,444 | A | * | 1/1975 | Portwood ........................ 160/90 |
| 4,073,097 | A | * | 2/1978 | Jentoft et al. ..................... 52/22 |
| 4,223,493 | A | * | 9/1980 | Moench et al. ................. 52/200 |
| 4,242,849 | A | * | 1/1981 | Benkelman et al. ....... 52/745.15 |
| 4,333,295 | A | * | 6/1982 | Janke ............................. 52/836 |
| 4,335,551 | A | * | 6/1982 | Benkelman et al. ........... 52/200 |
| 4,344,261 | A | * | 8/1982 | Weisner et al. ................ 52/200 |
| 4,408,422 | A | * | 10/1983 | Bechtold ........................... 52/72 |
| 4,470,230 | A | * | 9/1984 | Weisner .......................... 52/200 |
| 4,549,379 | A | * | 10/1985 | Hoy et al. ....................... 52/200 |
| RE32,539 | E | * | 11/1987 | Jentoft et al. .................. 52/200 |
| 4,750,302 | A | * | 6/1988 | Bechtold ........................... 52/72 |

(Continued)

OTHER PUBLICATIONS

A.I.A. Industries, Inc. of Denver, CO 80216 Skylight Domes webpages.

(Continued)

*Primary Examiner* — Joshua J Michener
*Assistant Examiner* — Matthew Gitlin
(74) *Attorney, Agent, or Firm* — Brooks Kushman P.C.

(57) ABSTRACT

A skylight assembly is provided with a glazing unit which transmits light while limiting heat transfer. The glazing unit has spaced apart top and bottom layer defining an enclosed cavity at least partially filled with translucent insulating particles. A peripheral frame formed in situ from a polymeric material about the glazing unit forming a leak-tight joint.

19 Claims, 3 Drawing Sheets

(56) References Cited

U.S. PATENT DOCUMENTS

| | | | | |
|---|---|---|---|---|
| 4,823,525 | A | * | 4/1989 | Roberts et al. .................. 52/200 |
| 4,884,379 | A | * | 12/1989 | McCabe ........................ 52/200 |
| 4,984,402 | A | * | 1/1991 | Davies .................... 52/204.593 |
| 4,998,392 | A | * | 3/1991 | Massarelli et al. .............. 52/208 |
| 5,027,574 | A | * | 7/1991 | Phillip ........................ 52/171.3 |
| 5,118,543 | A | * | 6/1992 | McColl .......................... 428/34 |
| 5,207,036 | A | * | 5/1993 | Sampson et al. .................. 52/72 |
| 7,024,830 | B2 | * | 4/2006 | Schiedegger et al. ...... 52/204.61 |
| 7,296,388 | B2 | | 11/2007 | Valentz et al. |
| 7,490,445 | B2 | * | 2/2009 | Steffek et al. .................. 52/456 |
| 7,641,954 | B2 | * | 1/2010 | Rouanet et al. ................ 428/76 |
| 8,117,790 | B2 | * | 2/2012 | Nemazi et al. .................. 52/213 |
| 2005/0055901 | A1 | * | 3/2005 | Valentz et al. ................ 52/198 |
| 2005/0074566 | A1 | * | 4/2005 | Rouanet et al. ................ 428/34 |
| 2005/0178078 | A1 | * | 8/2005 | Valentz et al. ................ 52/200 |
| 2006/0144013 | A1 | * | 7/2006 | Rouanet et al. ............. 52/782.1 |
| 2007/0122588 | A1 | * | 5/2007 | Milburn ........................ 428/117 |
| 2007/0148379 | A1 | * | 6/2007 | Theios et al. .................. 428/34 |
| 2007/0180789 | A1 | * | 8/2007 | Valentz et al. ............... 52/733.2 |
| 2007/0243358 | A1 | * | 10/2007 | Gandini ........................ 428/119 |
| 2008/0092456 | A1 | * | 4/2008 | Millett et al. ........................ 52/1 |
| 2008/0184635 | A1 | * | 8/2008 | Nemazi et al. .................. 52/200 |
| 2008/0302032 | A1 | | 12/2008 | Valentz et al. |
| 2009/0255194 | A1 | * | 10/2009 | Memari et al. ............... 52/173.3 |
| 2010/0139195 | A1 | * | 6/2010 | Tinianov et al. ........... 52/309.13 |
| 2010/0205881 | A1 | * | 8/2010 | Sonderkaer et al. ............ 52/209 |
| 2011/0036027 | A1 | * | 2/2011 | Back et al. ...................... 52/172 |
| 2012/0112383 | A1 | * | 5/2012 | Nemazi et al. ................ 264/263 |

OTHER PUBLICATIONS

Cabot Corporation webpages "Aerogel/Daylighting—Using Nanogel in Daylighting Systems" 2008.

Wikipedia, "Aerogel" definition.

"The Only Eco-Insulation for High-Performance Daylighting", Solar Components Corporation webpages, 2007.

"Nanogel Insulated Translucent Panels", Solar Components Corporation webpages, 2007.

Kalwall—Standard Unit nanogel Skylights webpages with price lists.

* cited by examiner

INSULATED SKYLIGHT ASSEMBLY AND METHOD OF MAKING SAME

BACKGROUND OF THE INVENTION

1. Field of the Invention

The present invention relates to an insulated skylight assembly and the method for making same.

2. Background Art

Skylights have been used to allow light into residential and commercial buildings through an opening. The aesthetic value and possible health benefit of having skylights in buildings have led to an increasing demand for these structures. But, since the skylight installation requires an opening in a roof, heat loss through and sealing of such units has presented numerous challenges.

In order to provide good thermal insulation, typically at least two spaced apart transparent layers have been used to enclose the region between a frame forming an insulated glass unit (IGU). A state of the art skylight having an IGU and a molded unitary frame is shown in U.S. Pat. No. 7,296,388, entitled "Skylight Having a Molded Frame," which is incorporated herein in its entirety. But, the thermal transmission of conventional glazing materials such as an IGU typically is significantly higher than the thermal transmission of conventional building materials such as a framed roof, resulting in significant heat loss in winter, and heat gain in summer.

It is advantageous to provide a skylight having a good seal while providing excellent resistance to thermal transmission through the fenestration unit.

SUMMARY OF THE INVENTION

A skylight assembly for use on a building to allow the transmission of light from a building exterior to a building interior while limiting heat transfer includes a translucent glazing unit. The translucent glazing unit includes a top layer facing the building exterior and a bottom layer spaced apart from the top layer. Between the top and bottom layers are outer web walls. The top and bottom layers have a sealed outer periphery defining an enclosed cavity. At least a portion of the cavity is filled with insulating particles which allow light transmission and limit heat transfer. The skylight assembly also has a peripheral frame. The frame entraps a region of the glazing unit adjacent to the outer periphery, forming a leak-tight joint between the glazing unit and the frame. The center region of the glazing unit is left free to transmit light.

In another embodiment, a skylight assembly for use on a building to transmit light from a building exterior to a building interior while limiting heat transfer includes a translucent glazing unit, a light transmitting polymeric domed panel, and an overmolded peripheral frame. The glazing unit includes a top layer facing the building exterior and a bottom layer spaced apart from the top layer. The top and bottom layers have a sealed outer periphery defining an enclosed cavity. At least a portion of the cavity contains an insulating aerogel. The domed panel is mounted to an outer periphery region of the top layer of the translucent glazing unit. The frame is formed in-situ, and includes a polymeric material which entraps the peripheral region of the glazing unit and attached domed panel forming a leak-tight joint frame while leaving the center region of the glazing panel free to transmit light.

In another embodiment, a method is recited for making a skylight assembly for use on a building to transmit light from a building exterior to a building interior while limiting heat transfer. The method includes providing a translucent central panel having spaced apart top and bottom layers, and a wall defining a partially enclosed cavity therebetween. The cavity has at least one opening. The partially enclosed cavity is filled through at least one opening with an aerogel. The opening is then sealed. The sealed panel is inserted into a mold. A frame formed of a polymeric material is molded about the peripheral region of the panel. The skylight assembly is then removed from the mold.

DETAILED DESCRIPTION OF THE PREFERRED EMBODIMENT(S)

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to utilize the present invention.

Except where expressly indicated, all numerical quantities in the description and claims, indicated amounts of material or conditions of reaction and/or use are to be understood as modified by the word "about" in describing the broadest scope of the present invention. Practice within the numerical limits stated should be desired and independently embodied. Ranges of numerical limits may be independently selected from data provided in tables and the description. The description of the group or class of materials as suitable for the purpose in connection with the present invention implies that the mixtures of any two or more of the members of the group or classes are suitable. The description of constituents in chemical terms refers to the constituents at the time of addition to any combination specified in the description and does not necessarily preclude chemical interaction among constituents of the mixture once mixed. The first definition of an acronym or other abbreviation applies to all subsequent uses herein of the same abbreviation and applies to normal grammatical variations of the initially defined abbreviation. Unless expressly stated to the contrary, measurement of a property is determined by the same techniques previously or later referenced for the same property. Also, unless expressly stated to the contrary, percentage, "parts of," and ratio values are by weight, and the term "polymer" includes "oligomer," "copolymer," "terpolymer," "pre-polymer," and the like.

It is also to be understood that the invention is not limited to specific embodiments and methods described below, as specific composite components and/or conditions to make, of course, vary. Furthermore, the terminology used herein is used only for the purpose of describing particular embodiments of the present invention and is not intended to be limiting in any way. It must also be noted that, as used in the specification and the pending claims, the singular form "a," "an," and "the," comprise plural reference unless the context clearly indicates otherwise. For example, the reference to a component in the singular is intended to comprise a plurality of components.

Figures 1, 2, 3:
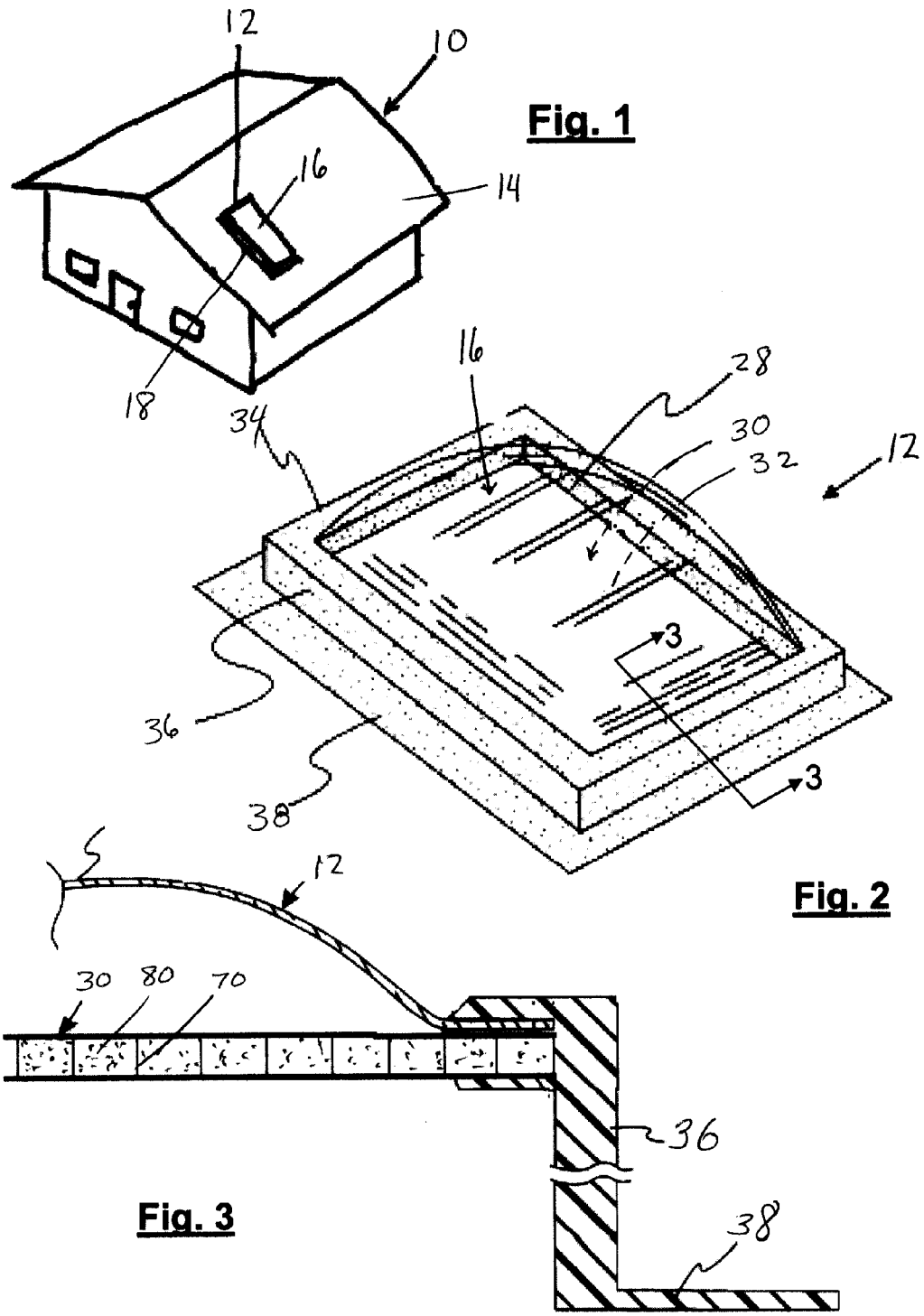
FIG. 1 is a perspective view of a house having a skylight assembly according to an embodiment of this invention.
FIG. 2 is a perspective view of a skylight assembly according to an embodiment of this invention.
FIG. 3 a is cross-section of a skylight assembly along axis 3-3 in FIG. 2 according to an embodiment of this invention.

FIG. 1 illustrates a fenestration unit typically found on a non-vertical wall, in particular, a skylight assembly according to an embodiment of the present invention. FIG. 1 shows a building 10 which incorporates a skylight assembly 12 into a building's roof 14. The roof pitch is typical of residential designs, but it is understood that the roof pitch may vary from flat roofs to steep chalet-type pitches. Any type of roof may be suitable, such as, roofs for commercial facilities including warehouses or industrial buildings, without exceeding the scope of this invention. The skylight assembly may further be a tubular skylight for use in connecting a roof with an interior room not adjacent to the roof in order to transmit exterior light to the interior room. The skylight assembly 12 includes a light admitting panel 16 and a frame 18 structure supporting the panel 16. The frame 18 structure is connected to the roof 14.

Turning now to FIG. 2, the light admitting panel 16 includes a light transmitting polymeric panel 28 mounted to an outer peripheral region of a top layer of a translucent glazing unit 30. The glazing unit 30 has at least one plastic panel 32. The glazing unit 30 of the invention can be provided in any suitable size and/or shape. Typically, light admitting panel 16 can be used to replace the IGU typically found in conventional skylight assemblies. Accordingly, the glazing unit 30 of the invention may generally have the same peripheral thickness of the conventional IGU which is often less than 100 mm thick, or more preferably less than 50 mm thick. It is preferred that the glazing unit 30 has a peripheral thickness in the range of 10-30 mm thick. The glazing unit 30 in the illustrated embodiment is generally planar. It should be understood that the glazing unit 30 may be any suitable shape and can also be domed.

The skylight assembly 12 also includes a peripheral frame 34 formed in-situ of a moldable polymeric material entrapping the glazing unit 30. The entrapped glazing unit 30 forms a leak-tight structural joint with the peripheral frame 34. The peripheral frame 34 in the skylight embodiment illustrated may optionally be provided with a curb portion 36 and a flashing portion 38 as shown in FIGS. 2-3. The curb portion 36 and the flashing portion 38 are sufficiently sized to stand the glazing unit 30 and the peripheral frame 34 above the roof 14 to which the skylight assembly 12 is mounted. Flashing 38 facilitates the mechanical connection of the skylight assembly 12 to the building roof 14 and provides a water-tight seal between the skylight assembly 12 and the building roof 14. Alternatively, the skylight assembly 12 can be made without an integral curb enabling the skylight to be mounted on a conventional rooftop skylight curb.

While FIG. 2 illustrates a rectangular skylight assembly made in accordance with the present invention, it is understood that the skylight assembly may be formed in any suitable shape, such as a circular shape, or an elliptical shape.

The glazing unit 30 is illustrated with the light transmitting polymeric panel 28, shaped like a dome, disposed above the glazing unit 30 towards the exterior of the building. The dome may be connected to the glazing panel 30 at the peripheral edges using an adhesive, a two-sided tape, or other suitable connectors known in the art, forming the light admitting panel 16. A suitable two-sided tape is described the applicant's published patent application US 2007/0180789 entitled "Polymeric Insulated Glazing Unit With Molded Frame" dated Aug. 9, 2007 which is incorporated by reference herein. In the embodiment illustrated in FIGS. 2-3, the dome after being bonded to glazing unit 30 to form light admitting panel 16, is overmolded by the peripheral frame 34.

The light transmitting polymeric panel 28 may be formed from a number of deformable materials known in the art, such as a thermoset plastic; a lightly cross-linked thermoplastic material; and/or a thermoplastic plastic, such as an acrylic, a polycarbonate, or a terephthalate material. It is understood that the panel 28 may include other additives and layers such as a low-E coating, a scratch resistant coating, and/or a weather-resistant layer. When panel 28 is dome-shaped, the dome may be formed by processes known in the art such as vacuum forming, sag bending, rotomolding, injection molding, twin sheet thermoforming, and casting. The dome may include a plurality of laminated layers to provide functions such as resistance to small missile penetration in high wind velocity conditions. A suitable laminated dome is described the applicant's co-pending patent application U.S. Ser. No. 11/758,926 entitled "Fenestration Product Such As A Skylight Having A Laminated Glazing Unit" filed Jun. 6, 2007 which is incorporated by reference herein.

The moldable polymeric material used to form the peripheral frame 34 can be any one of a number of polymeric materials. Preferably, the frame 34 is formed of Reaction Injection Molded (RIM) polyurethane as described in U.S. Pat. No. 7,296,388 previously incorporated by reference. The polymeric materials may alternatively be thermoplastic, non-limiting examples of which are polycarbonate, polyethylene, poly(methyl methacrylate), polyvinyl chloride, and mixtures thereof. The moldable thermoplastic material may also include, but are not limited to, unreinforced thermoplastics, reinforced thermoplastics, or filled thermoplastics, and combinations thereof, such as a glass fiber reinforced filled polypropylene. Thermoplastic material should be selected to have a relatively low melting temperature, which is less than the melting temperature of the plastic of glazing unit 30 or light transmitting polymeric panel 28, so that frame's thermoplastic material can be molded, but not damage the materials comprising the light admitting panel 16.

Non-limiting examples of other alternative polymeric materials for the frame 34 include rubber, synthetic rubber, ethylene-propylene-diamine-monomer rubber (EPDM), liquid silicone resins, and heterochain polymers produced by a condensation polymerization reaction, such as polyurethane, polyimides, polyimines, polyamide, polycarbonate, and polysiloxanes. Depending upon the material selected, an adhesion layer (not shown) painted onto the light admitting panel 16 may be needed to facilitate a bond between the frame material and the periphery of the light admitting panel 16.

The frame 34 may be formed by a number of different molding processes. For example, frame 34 may be formed by injection molding, compression molding, or preferably by reaction injection molding (RIM). A preferred molding process is chosen to improve the strength, to minimize the part weight, and to provide optimum thermal insulation qualities. To this end, the frame 34 may optionally includes one or more hollow cores (not shown) that may be filled with foamed plastic. Alternatively frame assemblies 34 may have hollow cavities may be made by gas-assisted injection molding which uses a conventional injection molding press equipped with a spillover control and a mold equipped with a gas injection and spillover points. Suitable gas-assisted injection molding processes that may be used to form the frame 34 of the present invention are described in U.S. Pat. No. 6,019, 918, the entire disclosure of which is incorporated here by reference.

A particularly advantageous frame 34 may be formed using RIM. RIM refers to any process where chemicals are mixed, partially reacted, and injected into a closed mold where the reaction is completed. In particular, RIM includes the production of solid elastomeric parts by rapid injection of polyurethane, polyurea, or hybrid systems using self-cleaning high-pressure machines. The low viscosity liquids that are reacted during the RIM process are mixed at pressures typically of 10 to 20 megapascals (MPa). The resulting frame typically has a thickness in the range of 1.5 to 10 millimeters in thickness. It is understood that the thickness of the frame can be any suitable thickness, but the cost of materials may become a primary constraint on frame thickness. Materials cost and processing time increase significantly as a typical frame becomes thicker.

Most RIM formulations are based on a condensation-polymerization-reaction-derived heteronuclear polymer. A non-limiting example of the condensation-polymerization-reaction-derived heteronuclear polymer is polyurethane, prepared from isocyanate and polyol reactions. While the process is described as RIM, it should be understood that other processes such as reinforced RIM (RRIM) or structural RIM (SRIM) may be used without exceeding the scope or the intent of the invention.

Turning now to FIG. 3, the glazing unit 30 has a top layer and bottom layer with peripheral edges defining a cavity 80 therebetween. The top and bottom layers are spaced apart and connected by a web 70 interposed between the top layer and bottom layer. It is preferable that the web 70 includes side walls disposed approximately at the peripheral edges and may additionally include intermediate walls disposed between the peripheral edges. These intermediate walls are spaced approximately parallel to one another defining elongate channels between them subdividing internal cavity 80. In certain embodiments, the intermediate walls and the side walls of the web 70 are similar in thickness. Extrusion of a sheet of the glazing unit 30 profile is an example where similar thicknesses of the web 70 aid manufacturability. The extruded sheet is then sliced to narrower, and more useful, widths.

It is understood that the intermediate web 70 may extend completely between the top and bottom surfaces, as shown, or may constitute elongated upstanding or down-standing members pendant from the top layer or bottom layer without exceeding the scope or the intent of the present invention. It is further understood that the web 70 may be present only in a portion of the longitudinal axis of the web. The web, the top layer, and the bottom layer define the enclosed a cavity 80. The cavity 80 of FIGS. 3-5 may be filled with air or other suitable gas as well as insulating particles, such as an aerogel 76, to provide a thermal barrier when the skylight assembly 12 is installed in the roof 14 of a building.

Figure 4:
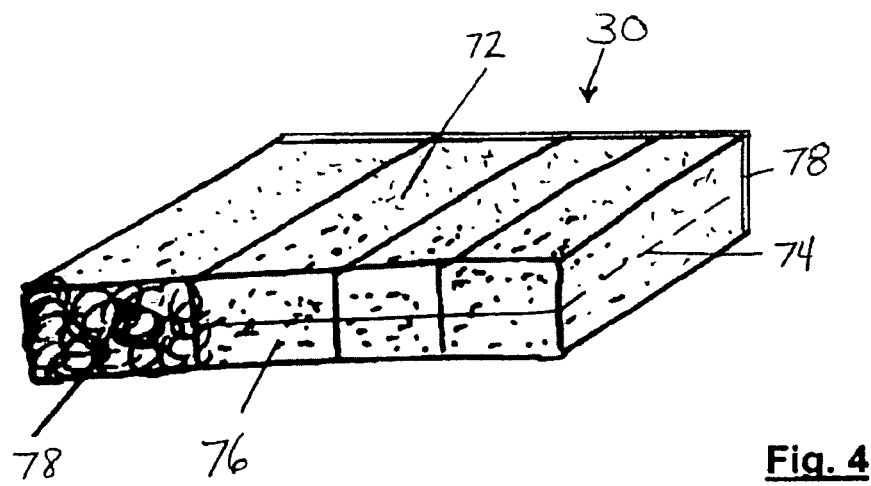
FIG. 4 is a fragmentary perspective cross-section view of an insulated glazing unit.

In embodiments where the elongate channels 72 extend to the peripheral edge of the glazing unit 30, one end of the channels may be sealed prior to filling the cavity 80 with the aerogel 76. An end cap 78 may be applied to one end of the channel as shown in FIG. 4 to prevent spilling of the aerogel 76. After filling the cavity with the aerogel 76, a second end cap may be applied to the other end of the channel 72 to seal the glazing unit 30. The end cap 78 may be any suitable material for containing the aerogel 76 and resisting intrusion of the polymeric material of the frame during molding of the frame 34. Non-limiting examples of the end cap material include a tape, a foam, a sealer, a metal, a wax, a thermoplastic polymeric material, or a thermoset polymeric material. The polymeric material of the frame may exert a force on the end cap 78 exceeding 1 lbf/in$^2$ relative to atmospheric pressure.

With a pitched roof, the aerogel particles may tend to migrate to one end of the skylight 12 under the influence of gravity. Preferably, the channels' 72 longitudinal axes are aligned parallel with the short side of a rectangular skylight and transverse to the pitch of the roof 14, as illustrated in FIGS. 2 and 3, in order to keep the channels relatively horizontal when installed on an inclined roof thereby minimizing any shifting of the aerogel 76.

While the channels 72, as illustrated in FIG. 3, are rectangular in shape, it should be understood that the channels 72 may be any shape, including, polygonal, and/or other tubular shapes without exceeding the scope of the present invention. The channels 72 may also be divided by an optional partition layer 74, which is illustrated as being generally parallel to the top and bottom layers of the glazing unit 30.

The aerogel 76 includes hydrophobic particles. Non-limiting examples of the aerogel 76 particles include organic aerogel particles and inorganic aerogel particles, which include metal oxide aerogel particles. Examples of the metal oxide aerogel particles may include, but are not limited to, silica, titania, alumina, and combinations thereof. Examples of the organic aerogel particles include, but are not limited to, melamine-formaldehyde aerogel particles, resorcinol-formaldehyde aerogel particles, and combinations thereof. Silica aerogels are commercially available from a variety of sources including Cabot Corporation of Boston Mass. In certain embodiments the aerogel 76 particles have a particle diameter ranging from 0.005-4 mm.

To limit thermal transmission through the light admitting panel 16, it is preferable that the aerogel 76 comprises substantially all of the cavity 80 of the glazing unit 30. A non-limiting example of glazing unit 30 is a 4-ft. by 8-ft. multi-wall panel, that is 6 or 8 mm thick. The top and bottom layers are between 0.5-1.5 mm thick. The glazing unit 30 is substantially filled with aerogel 76. It is understood that the top and bottom layers may have substantially different thickness from the typical values. A non-limiting example is when the glazing unit 30 is designed to meet regulatory codes to prevent a user from falling through a skylight. An example of the glazing unit 30 is available from Solar Components (Manchester, N.H.) which are filled with Nanogel™ aerogel from Cabot Corporation (Boston, Mass.). It is understood that in certain embodiments, the aerogel 76 occupies less than the entire thickness of the glazing unit 30. The unoccupied region in preferably minimized so that the aerogel 16 can not shift about forming voids causing convection cells to develop within the channel 72.

In at least one embodiment, the skylight assembly 12 functions as a bandpass filter, minimizing the transmission of infrared wavelength radiation while maximizing visible wavelength radiation. In at least one embodiment, the ratio of infrared radiation to visible radiation transmitted by the skylight assembly ranges from 0.9 to 1.7 when calculated as the solar heat gain coefficient divided by the fractional light transmittance. In another embodiment, the ratio of infrared radiation to visible radiation transmitted by the skylight assembly 12 ranges from 0.95 to 1.5. When using a skylight assembly 12 of a certain embodiment, the ratio of infrared radiation transmitted to visible radiation transmitted is 1. In another embodiment, an opal-colored polycarbonate panel filled with aerogel 76 has a ratio of infrared to visible radiation transmission of 1.5.

The aerogel 76 in at least one embodiment may have a thermal conductivity in the range of 0.5-2 W/(m$^{2 \cdot \circ}$K.) for a 1 inch (25.4 mm) thick section of aerogel 76. Another embodiment, the aerogel 76 may have a range of 0.57-1.42 W/(m$^2 \cdot °$K.) for a 1 inch thick section. In a further embodiment, using the Nanogel™ aerogel, the thermal conductivity (U-value) is about 0.71 W/(m$^2 \cdot °$K.) for a 1 inch section. The Nanogel™ aerogel is available from Cabot Corporation (Boston, Mass.) with thicknesses ranging from 0.5 inches (13 mm) to 2.5 inches (64 mm). In another embodiment, the aerogel transmits heat at a rate of an R-value of 8 per inch (0.71 W/(m$^2 \cdot °$K.). The U-value of the aerogel 76 of yet another embodiment, when measured by ASTM C1363, ranges from 1.42 W/(m$^2 \cdot °$K.) to 0.28 W/(m$^2 \cdot °$K.), respectively.

At least one embodiment of skylight assembly 12 may have thermal conductivity in the range of 0.25 W/(m$^{2°}$K.) to 1.5 W/(m$^2 \cdot °$K.) when the thickness of the skylight assembly 12 ranges from 2.75 inches (70 mm) to 0.75 inches (20 mm), respectively. For example, the skylight assembly 12 where the glazing unit 30 is approximately 1 inch thick and the light transmitting polymeric panel 28 is a domed shape that is 4 inches above the glazing unit 30, the thermal conductivity ranges from 0.6 W/(m$^2 \cdot °$K.) to about 1.3 W/(m$^2 \cdot °$K.).

The top layer of glazing unit 30 may be a thermoplastic sheet, such as a polycarbonate (PC), polyester terephthalate (PETE), or other translucent thermoplastics. Lightly cross-linked thermoplastics as well as translucent thermoset plastics may also be suitable for the top layer without exceeding the scope and intent of this invention. The top layer may optionally have additives and adjuvants incorporated into the top layer or applied as a layer on the top layer to enhance the UV degradation resistance, scratch resistance of that top layer, and other properties.

The top layer, when the light transmitting polymeric panel 28 is not used, may need to be more environmentally durable than the bottom layer and have higher physical properties in order to resist damage by windborne debris. The top layer may be at least 1 mm thick when the protective dome is not employed The bottom layer of the glazing unit 30 may have a thickness selected independently from the top layer because the functional requirements do not require the protective function of the top layer. Therefore, the bottom layer may be a relatively thin sheet of thermoplastic plastic, lightly cross-linked thermoplastic plastic, or thermoset plastic.

When the light transmitting polymeric panel 28 is used to provide a more environmentally durable skylight assembly 12, the light transmitting polymeric panel's 28 thickness may be independently selected from the wall thicknesses of the glazing unit 30. The wall thickness of the light transmitting polymeric panel 28 may range from 1 mm to 5 mm in certain embodiments. In other embodiments, the thickness of the light transmitting polymeric panel 28 may range from 2 mm to 4 mm. The presence of the light transmitting polymeric panel 28 allows the glazing unit 30 to be formed of thinner wall thicknesses because the unit 30 is protected from the outdoor environment. The wall thickness of the glazing unit 30 may range from 0.25 mm to 3 mm in certain embodiments. In other embodiments, the wall thickness of the glazing unit 30 may range from 0.5 mm to 1.5 mm.

Web 70 at the peripheral edges of glazing unit 30 may be sufficiently thick or reinforced sufficiently to resist any pressure during encapsulation during molding of the frame 34. The web 70 in the central region may also be relatively thin. Web 70 may have thickness ranges similar to the bottom layer in certain embodiments. In general, when extruded, often the web, top layer, and bottom layer have similar or identical thicknesses.

In an alternative embodiment, the web may be a grid. The web 70 may be formed by suitable means such as extrusion, which is particularly advantageous for forming a channel structure, or by injection molding, which is particularly advantageous when forming a grid structure in a glazing unit having two or more separate layers which are joined together after the grid cells are filed with aerogel 76.

In at least one embodiment, the light transmitting polymeric panel 28 optionally connects to the glazing unit 30 using a bonding agent. Non-limiting examples of the bonding agent include two-sided tape, transfer tape adhesive, hot melt adhesive, reactive adhesives, such as polyurethane caulk, a silicone sealant, or an epoxy adhesive. These are collectively known in the art as CASE (coatings, adhesive, sealant, and elastomer) products.

In at least one embodiment, the light admitting panel 16 may permit transmission of light from the top layer to the bottom layer in a range from 10% to 75% of the initial light impinging on the top layer when measured using test method ASTM D1003. In another embodiment, the transmission of light may range from 13% to 35%. In yet another embodiment, the transmission of light may range from 15-25%. The greater the thickness of the aerogel 76 layer, the lower the light transmission and lower the heat loss. In yet another embodiment, the light admitting panel 16 allows 75% of the impinging visible light to be transmitted for each centimeter of thickness of the aerogel 76. In a further embodiment, a 16 mm thick glazing panel filled with a silica aerogel can transmit 50% of the visible light and provide an insulation R value of 4 (1.42 W/(m$^2 \cdot °$K.)) (U-value of 0.25), based on center-of-the-panel calculation. In another embodiment, a 25 mm thick glazing panel filed with a silica aerogel can transmit 30% of the visible light and provide an insulation R value of 6 (1.06 W/(m$^2 \cdot °$K.)) (U-value 0.17). In high sun load regions, when used in an air-conditioned building, even thicker glazing panels can be used to minimize total energy cost. Allowing as little as 10% of the visible light to pass still provides a usable skylight giving the occupant of the building a clear sense of the daylight status outside.

The light admitting panel 16, once assembled, is inserted into a mold for forming a frame. Once the mold is closed, the moldable polymeric material is introduced into the mold cavity. The polymeric material encapsulates the overlapping peripheral edges of the light admitting panel 16. The side walls 68 prevent the moldable polymeric material from intruding into the central cavity 80. When the overmolding process is complete and the frame 34 has sufficient structure to be handled, the skylight assembly 12 is removed from the mold forming a substantially complete skylight. The frame 34 can be designed to mount on an existing skylight curb or the frame 34 may integrally include a curb and flashing as illustrated in FIG. 2. It is understood that the frame 34 may have optional coatings applied to provide additional features such as color. Examples of the coating are an in-molding coating, a gel coat, or a paint.

Figure 5:
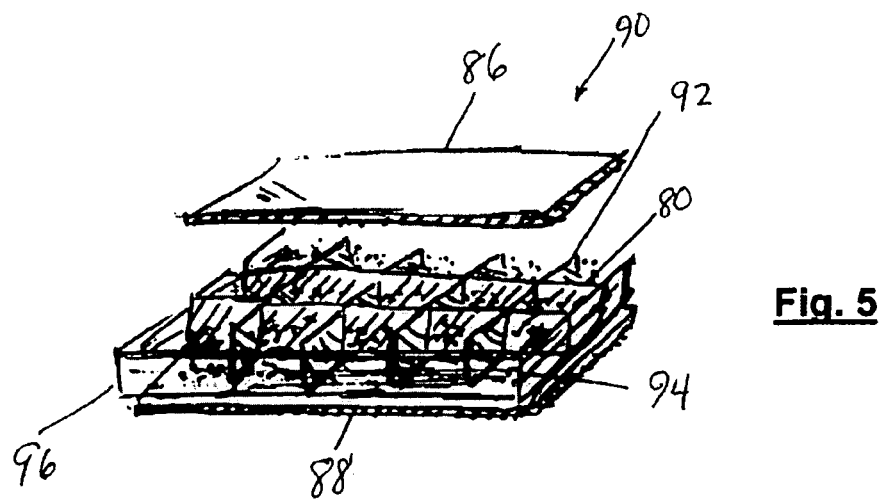
FIG. 5 is an exploded fragmentary perspective cross-section of an insulating glazing unit according to another embodiment of this invention.

Referring now to FIG. 5, an alternative embodiment of a glazing unit 90 is illustrated according to this invention. Glazing unit 90 includes top layer and bottom layer. In cavity 80, defined by top layer 86 and bottom layer 88, a grid 92 is inserted therebetween and supported on bottom layer. Aerogel 76 then fills a portion of cell 94 defined by grid 92. Top layer 86 is then applied to grid 92 to form light admitting panel 14. Tape 96 connects top layer with bottom layer at the periphery and functions as a retention structure for the aerogel 76 within the grid 92. Alternatively the assembly can be joined together using adhesives, a hot plate weld, a solvent weld or other known laminating methods. Glazing unit 90 then may be inserted into a mold and connected to peripheral frame 34. It is further understood that the grid 92 may include channels with baffles positioned vertically or horizontally relative to the web 70. It is further understood that there may be a plurality of layers of web 70 divided by a plurality of other webs transverse to web 70 and spaced apart from and parallel to the top and bottom layers.

Figure 6:
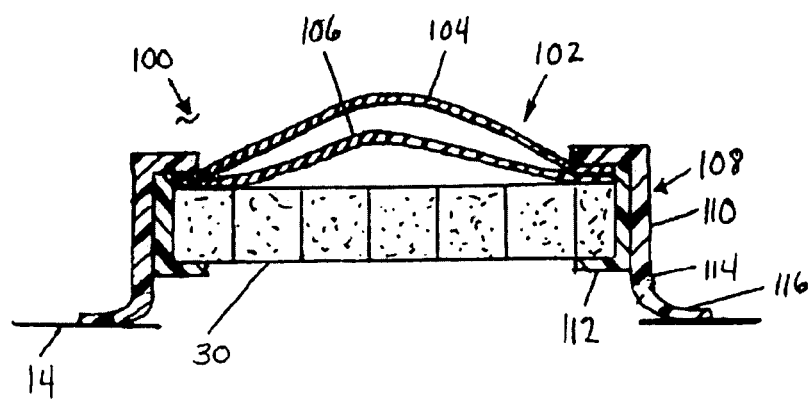
FIG. 6 is an alternative cross-section of a skylight assembly according to an embodiment of this invention.

Referring now to FIG. 6, an alternative embodiment of a skylight assembly 100 is illustrated according to this invention. Light admitting panel 102 includes an outer dome 104 which overlies an inner dome 106 towards the exterior of the building. Inner dome 106 overlies glazing unit 30. Outer dome 104 and inner dome 106 may be connected to glazing panel 30 at peripheral edges using adhesive, two-side tape, styrene butyl rubber, silicone, or other suitable connectors. It should be understood that inner dome 106 may be only intermittently connected to either outer dome 104 or glazing panel unit 30. In other embodiments, inner dome 106 may be closely fit without attachment to outer dome 104 and/or glazing panel unit 30. In yet other embodiments, circulation channels between the glazing unit 30, and outer dome 104 are contemplated within the scope of this invention.

Skylight assembly 100 further includes a multiple piece peripheral frame 108 engaging light admitting panel 102. Peripheral frame 108 has an exterior portion 110 facing the building exterior and connected to outer dome 104. Exterior portion 110 overlies an interior portion 112 of peripheral frame 108 protecting interior portion 112 from potentially damaging environmental attack such as wind-driven rain. Exterior portion 110 may include a curb portion 114 and/or a flashing portion 116 that are connected to the building's roof 14.

It should be understood that inner portion 112 may have the curb portion 114 and/or flashing portion 116 without exceeding the scope and intent of this invention. In other embodiments, the skylight assembly 12 or 100 may be fitted to an independent curb (not shown). In yet another embodiment the skylight assembly 12 or 100 when fitted to the curb may further include a hinge (not shown) to allow the skylight assembly 12 or 100 to be opened optionally to provide ventilation. Ventilation channels between the exterior portion 110 and interior portion 112 may be contemplated in yet another embodiment.

Exterior portion 110 and interior portion 112 may be joined in any suitable method known in the art, such as with an adhesive, caulk, plastic welding, or fasteners.

Either exterior portion 110 and/or interior portion 112, in certain embodiments, may be formed of any suitable frame material including, but not limited to, polymeric material, metallic material, ceramic material, silicone, and combinations thereof.

Exterior portion 110 and/or interior portion 112 may be formed using conventional joining mechanisms such as, but not limited to, corner keys, welded mitre joints, and formed corners into which lineal pieces of frame are inserted. In certain embodiments when polymeric materials are formed as extruded lineals of frame, the lineals may be joined by using conventional processes such a hot plate welding and ultrasonic welding. In other embodiments, either exterior portion 110 and/or interior portion 112 may be molded as a unitized frame using methods known in the art, such as injection molding.

Figure 7:
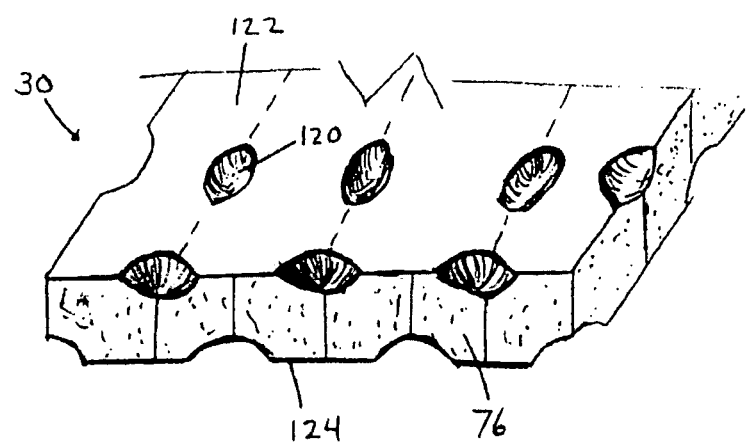
FIG. 7 is an alternative fragmentary perspective cross-section view of an insulated glazing unit.

Turning now to FIG. 7, since use of aerogel in glazing unit 30 reduces the transmission of light through panel 30, addition of depressions 120 in plastic panel 32 increases the surface area available to transmit light for a given planar area of plastic panel 32. In certain embodiments, an upper plastic panel 122 of glazing unit 30 has a plurality of depressions 120 which are alternating with depressions 120 in a lower plastic panel 124 of glazing unit 30. By alternating the depressions 120 in the panels 122 and 124, the aerogel 76 can remain substantially uniform in thickness and thereby retain the desirable limited thermal conductivity while increasing the quantity of light passing through the glazing unit 30.

It should be understood that in other embodiments, the quantity of light passing through glazing unit 30 with depressions 120 may be held constant relative to planar glazing unit 30 configurations. The use of selectively light reflective or absorptive materials as coatings on plastic panels 122 and/or 124, including selectively in depressions 120 on outer dome 104 and/or inner dome 106 may be used to vary the ratio of solar heat gain coefficient to the fractional light transmittance varying the ratio may allow response to the needs of the building in terms of environmental factors such as latitude or elevation, and utility consumption demands. Further, the ratio may adjust to the user's needs such as combating seasonal effective disorder.

It is further understood that in certain embodiments, a plurality of depressions 120 may also be included in inner dome 106 without exceeding the scope of this invention. In further embodiments, it is understood a plurality of protrusions from the surfaces of outer dome 104, inner dome 106, and/or plastic panels 122, 124 may be used instead of the plurality of depressions without exceeding the scope of this invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A skylight assembly for use on a building to allow transmission of light from a building exterior to a building interior while limiting heat transfer, the skylight assembly comprising:
   a translucent glazing unit including a top plastic layer having a surface facing the building exterior and a bottom plastic layer having a surface facing the building interior spaced apart from the top plastic layer, the top and bottom plastic layers having a sealed outer periphery defining an enclosed cavity, at least a portion of the enclosed cavity being filled with insulating aerogel particles which allow light transmission and limit heat transfer and wherein a plurality of alternating depressions are disposed in the top and bottom plastic layers to retain said aerogel particles in a substantially uniform thickness; and
   a peripheral frame having polymeric material formed in-situ entrapping and directly bonding to a peripheral region of the translucent glazing unit, the polymeric material contacting the sealed outer periphery, the frame overlying the top plastic layer being a first thickness, and the frame being in direct contact with the bottom plastic layer being a second thickness and forming a leak-tight joint between the periphery region of the translucent glazing unit and the frame while leaving a center region of the translucent glazing unit free to transmit light.

2. The skylight assembly of claim 1, further defining a plurality of inner web members disposed between the top and bottom plastic layers of the glazing unit defining a plurality of internal channels within the enclosed cavity.

3. The skylight assembly of claim 2, wherein the internal channels are elongated and substantially parallel.

4. The skylight assembly of claim 3, wherein the sealed outer periphery of the glazing unit is defined at least in part by a capping material sealing closed opposed ends of the internal channels to trap aerogel therein while prevent intrusion of polymeric material during in-situ forming of the peripheral frame.

5. The skylight assembly of claim 2, wherein the glazing unit further comprises a second plurality of web members disposed between the top and bottom plastic layers defining a grid within the enclosed cavity to limit movement of the aerogel particles.

6. The skylight assembly of claim 1, further comprising a light transmitting domed polymeric panel mounted to an outer peripheral region of the top plastic layer of the translucent glazing unit defining an enclosed space therebetween.

7. The skylight assembly of claim 1 wherein the polymeric material comprises a condensation-polymerization-reaction-derived heteronuclear polymer having, before combination, a first precursor and a second precursor adapted to combine in a condensation polymerization reaction.

8. The skylight assembly of claim 7, wherein the condensation-polymerization-reaction-derived heteronuclear polymer comprises a RIM-injected polyurethane.

9. The skylight assembly of claim 1, wherein the frame includes a curb and a flashing capable of being mounted on a pitched roof, the translucent glazing unit having at least one channel within the enclosed cavity, the channel having a longitudinal axis transversely to the roofs pitch.

10. The skylight assembly of claim 1, wherein the top plastic layer of the glazing unit is thicker than the bottom plastic layer.

11. The skylight assembly of claim 1, wherein the first thickness is different from the second thickness.

12. The skylight assembly of claim 1, wherein the glazing unit has visible light transmission through the glazing unit ranging from 10% to 75% of initial visible light impinging on the top plastic layer.

13. A skylight assembly for use on a building to transmit light from a building exterior to a building interior while limiting heat transfer, the skylight assembly comprising:
   a translucent glazing unit including a center region, a top layer having a top layer surface facing the building exterior and a bottom layer having a bottom layer surface facing the building interior spaced apart from the top layer surface, the top and bottom layers having a sealed outer periphery defining an enclosed cavity, at least a portion of the cavity being filled with insulating aerogel which allow light transmission and limit heat transfer and wherein a plurality of alternating depressions are disposed in the top and bottom layers to retain said aerogel in a substantially uniform thickness;
   a light transmitting polymeric domed panel having a domed panel surface facing the building exterior mounted to an outer peripheral region of the top layer of the translucent glazing unit defining an enclosed space therebetween; and
   a peripheral frame formed in-situ from a polymeric material, the frame entrapping the translucent glazing unit including the bottom layer surface and at least one of the top layer surface and the domed panel surface, the frame being adapted to attach directly to the domed panel forming a leak-tight joint frame while leaving the center region of the translucent glazing unit free to transmit light.

14. The skylight assembly of claim 13 wherein the skylight assembly has a ratio of solar heat gain coefficient to fractional light transmittance ranging from 0.95 to 1.5.

15. The skylight assembly of claim 14, wherein the ratio is capable of variation when a plurality of depressions or protrusions are in the top layer of the translucent glazing unit.

16. The skylight assembly of claim 13, wherein the skylight assembly has a U-value from 0.25 to 1.5 W/(m2*° K) when using a 1 inch thick section of aerogel in the cavity.

17. The skylight assembly of claim 13, wherein the sealed outer periphery of the glazing unit resists intrusion into a cavity of moldable polymeric material during in-situ forming of the frame.

18. The skylight assembly of claim 13, wherein the skylight assembly hingedly connects to a curb, the skylight assembly being capable of opening from the curb when providing ventilation.

19. A skylight assembly for use on a building to allow transmission of light from a building exterior to a building interior while limiting heat transfer, the skylight assembly comprising:
   a translucent glazing unit including a center region, a plastic top layer having a top surface facing the building exterior, and a plastic bottom layer having a surface facing the building interior spaced apart from the plastic top layer, and end caps, the top and bottom layers having a sealed outer periphery defining an enclosed cavity, at least a portion of the cavity being filled with insulating aerogel particles which allow light transmission and limit heat transfer and wherein a plurality of alternating depressions are disposed in the plastic top and plastic bottom layers to retain said aerogel particles in a substantially uniform thickness; and
   a peripheral frame having a polymeric material formed in-situ entrapping a peripheral region of the translucent glazing unit including at least the bottom layer surface forming a leak-tight joint directly between the periphery region of the translucent glazing unit and the frame while leaving the center region of the translucent glazing unit free to transmit light, wherein the peripheral frame includes a curb contacting the building exterior, the polymeric material of the frame exerting a force on the end cap exceeding 1 lbf/in$^2$ relative to atmospheric pressure.

* * * * *